(12) United States Patent
McCullough et al.

(10) Patent No.: US 10,864,985 B2
(45) Date of Patent: Dec. 15, 2020

(54) ROTORCRAFT CENTRIFUGAL FORCE BEARING

(71) Applicant: Textron Innovations Inc., Providence, RI (US)

(72) Inventors: John McCullough, Weatherford, TX (US); Mark Adam Wiinikka, Hurst, TX (US); Matthew Curtis Ledbetter, North Richland Hills, TX (US)

(73) Assignee: Textron Innovations Inc., Providence, RI (US)

( * ) Notice: Subject to any disclaimer, the term of this patent is extended or adjusted under 35 U.S.C. 154(b) by 238 days.

(21) Appl. No.: 15/659,272

(22) Filed: Jul. 25, 2017

(65) Prior Publication Data
US 2019/0031328 A1 Jan. 31, 2019

(51) Int. Cl.
*B64C 27/39* (2006.01)
*B64C 27/35* (2006.01)
*B64C 27/48* (2006.01)

(52) U.S. Cl.
CPC .............. *B64C 27/39* (2013.01); *B64C 27/35* (2013.01); *B64C 27/48* (2013.01)

(58) Field of Classification Search
CPC ....... B64C 27/35; B64C 27/48; F16C 23/043; F16C 27/02; F16F 1/373; F16F 1/3732; F16F 1/393; F16F 1/3935; F16F 1/52; F16F 1/54
See application file for complete search history.

(56) References Cited

U.S. PATENT DOCUMENTS

| | | | | |
|---|---|---|---|---|
| 4,028,002 A | * | 6/1977 | Finney | B64C 27/35 416/134 A |
| 4,257,739 A | * | 3/1981 | Covington | B64C 27/35 416/134 A |
| 6,910,865 B2 | * | 6/2005 | Pancotti | B64C 27/32 416/134 A |
| 8,857,756 B2 | * | 10/2014 | Chrestensen | B64C 27/48 244/17.11 |
| 8,926,281 B2 | * | 1/2015 | Stamps | B64C 27/35 416/134 A |
| 9,156,544 B2 | * | 10/2015 | Wiinikka | B64C 27/605 |
| 9,347,487 B2 | * | 5/2016 | Anderson | F16C 27/063 |
| 9,764,831 B2 | * | 9/2017 | Jarrett | B64C 27/35 |
| 2007/0189649 A1 | * | 8/2007 | Montazeri | F16C 11/0614 384/192 |
| 2015/0078909 A1 | * | 3/2015 | Wiinikka | B64C 27/48 416/225 |
| 2015/0322287 A1 | * | 11/2015 | Ishmael | C09D 163/00 244/17.11 |

* cited by examiner

*Primary Examiner* — Nathaniel E Wiehe
*Assistant Examiner* — John S Hunter, Jr.
(74) *Attorney, Agent, or Firm* — Slater Matsil, LLP

(57) ABSTRACT

A centrifugal force (CF) bearing for a rotorcraft rotor assembly includes an inner-member, an outer-member, and an elastic member interposed between the inner- and outer-members. The inner-member includes a boss configured for location to and engagement with a yoke. The boss includes a tapered profile (e.g., conic) portion. A tapered recess region of the yoke includes a profile that is substantially matched to receive and contact the tapered profile of the boss. The CF bearing is configured for attachment to a grip of the rotor assembly. The boss is configured to communicate mechanical loads (e.g., centrifugal force, lateral shear, vertical shear) from the grip to the yoke during operation of the rotor assembly.

21 Claims, 9 Drawing Sheets

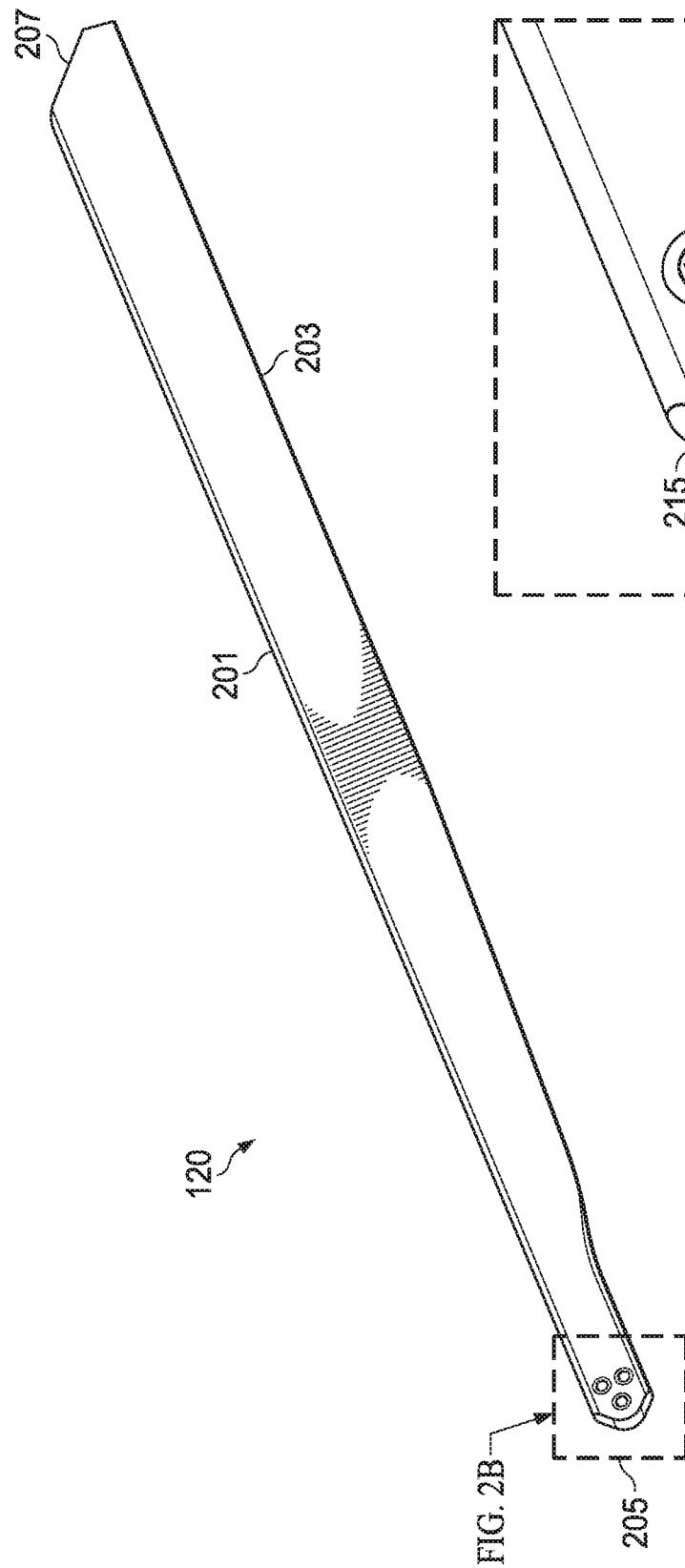
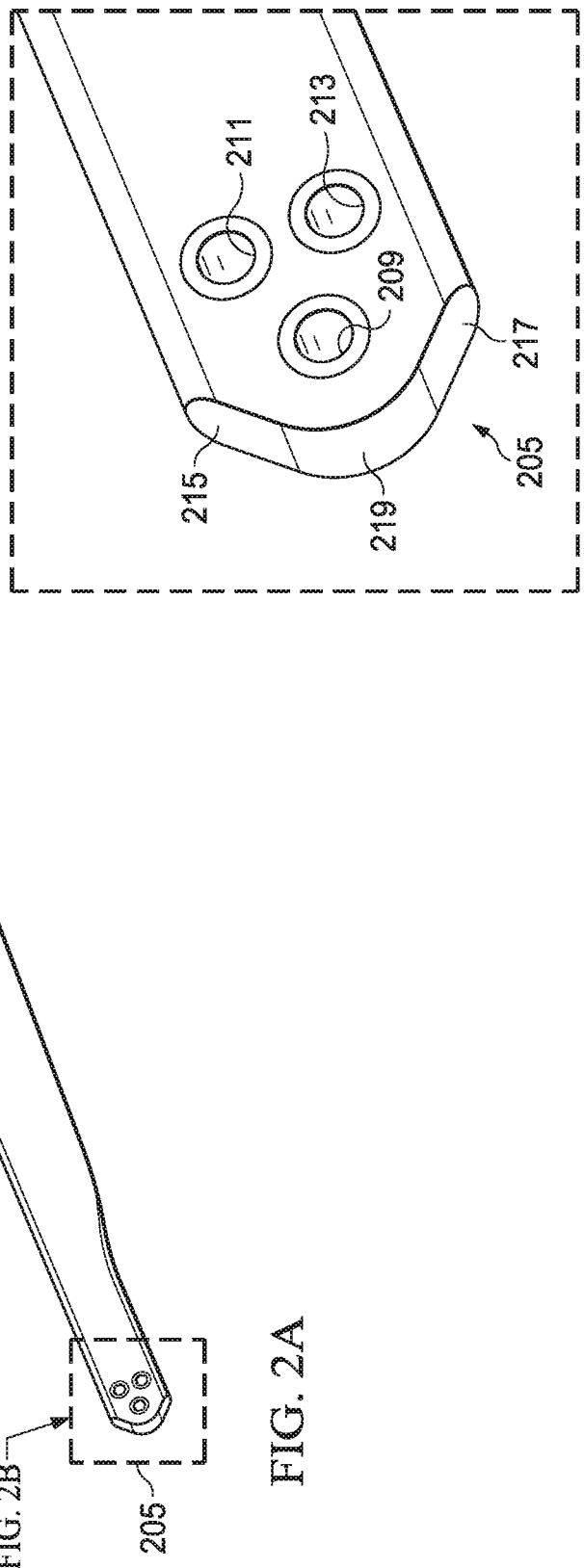
FIG. 2A
FIG. 2B

ROTORCRAFT CENTRIFUGAL FORCE BEARING

TECHNICAL FIELD

The present disclosure generally relates to a rotorcraft rotor assembly apparatus, and more specifically to a structural system and method for coupling a rotor blade to a rotor hub using a centrifugal force bearing.

BACKGROUND

There are a variety of conventional approaches for attaching rotor blades to rotor hubs. Though developments in rotor blade attachment mechanisms have been made, substantial room for improvement remains. For example, there is a need for an improved apparatus, structural system, and method for operably coupling a rotor blade to a rotor hub using a centrifugal force bearing.

SUMMARY

General aspects of the disclosure herein describe a centrifugal force (CF) bearing apparatus for a rotorcraft. The CF bearing includes a conical shear boss. The CF bearing has a first member, a second member, and a third member. The third member is disposed between and interposes the first member and the second member. The second member includes a first side having a first surface, and a second side having a second surface. The first surface has a protruding feature (e.g., a boss) that extends in a direction toward the first member. The second surface has a protruding feature that extends in a direction away from the third member. The protruding feature of the second surface includes a tapered (e.g., conic) profile.

Other general aspects describe a rotor assembly system that includes a rotor grip configured for attachment to a rotor blade, a yoke having a tapered recess, and a CF bearing. The CF bearing includes an inner-member, an outer-member, and an elastic member (e.g., formed from an elastomeric material, such as vulcanized rubber, or the like) disposed between the inner-member and the outer-member. The outer-member is attached to a portion of the rotor grip. The inner-member includes a first surface and a second surface, where the second surface opposes the first surface. The first surface has a protrusion that extends in a direction toward the outer-member. The second surface has a boss that protrudes in a direction away from the elastic member. The boss has a substantially continuously tapered (e.g., conic) profile. The boss is disposed in and on the tapered recess of the yoke.

Yet other general aspects describe a main rotor (MR) CF bearing of an articulated rotor system. The MR CF bearing is configured to transmit at least one of centrifugal force, lateral shear, or vertical shear mechanical loads into an MR yoke, whereby stress in the MR CF bearing and MR yoke (or other mating part) is reduced.

Still other general aspects describe a method that includes a step of operating a rotorcraft with an articulated main rotor assembly. The articulated main rotor assembly includes: a grip attached to a main rotor blade, a yoke having a tapered recess, and a CF bearing disposed between and interposing the grip and the yoke. The CF bearing has an inner-member (e.g., comprising 6Al-4V titanium, or the like), an outer-member (e.g., comprising steel, titanium, or the like), and an elastic member (e.g., including an elastomeric material, such as a polymer, vulcanized rubber, or the like) that is disposed between and interposes the inner-member and the outer-member. The outer-member is attached to the grip by a first clamp. The inner-member is located to and engaged with the yoke by a second clamp. The inner-member has a boss feature that protrudes in a direction away from the elastic member. The boss feature has a tapered (e.g., conic) profile that is substantially matched to and is configured for disposition in the tapered recess of the yoke. Other embodiments of these general aspects include corresponding apparatuses, each configured to perform actions of the methods.

Representative embodiments of the disclosure may provide one or more technical advantages. A technical advantage of one embodiment may include a capability to provide improved communication of mechanical loads (e.g., centrifugal force, lateral shear, vertical shear, or the like) from a rotor grip to a rotor yoke through a CF bearing. Another technical advantage of an embodiment may include a capability to reduce mechanical stress in a CF bearing and corresponding mating assembly (e.g., rotor yoke). Yet another technical advantage of an embodiment may include a capability to reduce fatigue or mechanical failure of an MR CF bearing-to-yoke joint attending operation of a main rotor assembly of a rotorcraft.

Certain embodiments may include some, all, or none of the above advantages. One or more other technical advantages may be clear to those skilled in the art upon review of the Figures, descriptions, and claims included herein.

BRIEF DESCRIPTION OF THE DRAWINGS

Representative aspects of the present disclosure may be understood from the following detailed description when read in conjunction with the accompanying Figures. It is noted that, in accordance with standard practice in industry, various features may not be drawn to scale. For example, dimensions of various features may be arbitrarily increased or reduced for clarity of illustration or description. Corresponding numerals and symbols in different Figures generally refer to corresponding parts, unless otherwise indicated.

FIG. 2A representatively illustrates a main rotor blade in accordance with an embodiment.

FIG. 2B illustrates a detailed view of a root end of the main rotor blade as shown in FIG. 2A.

DETAILED DESCRIPTION

Representative embodiments are discussed in detail below. It should be appreciated, however, that concepts disclosed herein may be embodied in a variety of contexts, and that specific embodiments discussed herein are merely illustrative and are not intended to limit the scope of the claims. Furthermore, various changes, substitutions, or alterations can be made herein without departing from the spirit and scope as defined by the appended claims.

Figure 1:
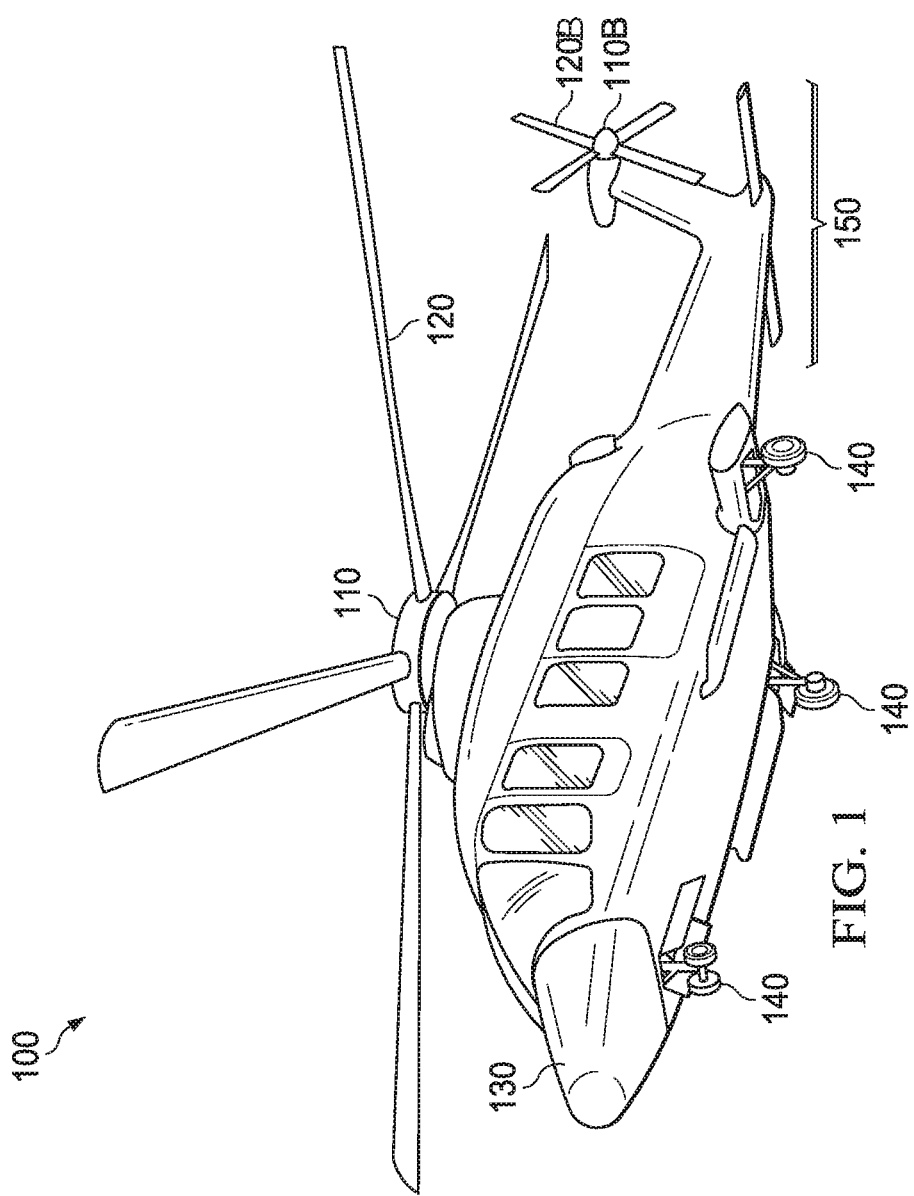
FIG. 1 representatively illustrates a rotorcraft in accordance with an embodiment.

FIG. 1 illustrates a rotorcraft 100 according to a representative embodiment. Rotorcraft 100 includes rotor system 110, main rotor blades 120, fuselage 130, landing gear 14o, and tail boom 15o. Rotor system 110 may rotate main rotor blades 120. Rotor system 110 may include a control system for selectively controlling pitch of each blade 120 to selectively control direction, thrust, and lift of rotorcraft 100. Fuselage 130 comprises the body of rotorcraft 100 and may be coupled to rotor system 110 such that rotor system 110 and main rotor blades 120 move fuselage 130 through the air in flight. Landing gear 140 support rotorcraft 100 during landing or when rotorcraft 100 is at rest on the ground. Tail boom 150 represents the rear section of rotorcraft 100 and includes tail rotor system 110B and tail rotor blades 120B. In a representative embodiment, tail boom 150 may also include mechanical linkage (not illustrated) to a powerplant (not illustrated) driving main rotor system 110. Tail rotor blades 120B counter torque effect created by rotor system 110 and main rotor blades 120. Teachings of certain embodiments relating to rotor systems described herein may apply to rotor system 110 or other rotor systems (e.g., tilt rotorcraft, tandem rotorcraft, or other helicopter rotor systems). It should also be appreciated that representative embodiments of rotorcraft 100 may apply to aircraft other than a rotorcraft.

A pilot may manipulate one or more pilot flight controls to achieve controlled aerodynamic flight. Inputs provided by the pilot to the pilot flight controls may be transmitted mechanically or electronically to flight control devices. Flight control devices may include devices operable to change flight characteristics of the aircraft. Representative flight control devices may include a control system operable to change a configuration of main rotor blades 120 or tail rotor blades 120B.

Cyclic pilot flight controls may allow a pilot to impart cyclic configurations to main rotor blades 120. Varied cyclic configurations of main rotor blades 120 may cause rotorcraft 100 to tilt in a direction specified by the pilot. For tilting forward and back (pitch) or tilting side-to-side (roll), the angle of attack of main rotor blades 120 may be altered with cyclic periodicity during rotation of rotor system 110, thereby creating variable amounts of lift at varied points in the rotation cycle. Alteration of cyclic configuration of main rotor blades 120 may be accomplished by input from a cyclic control assembly (not illustrated).

Collective pilot flight controls may allow a pilot to impart collective configurations (e.g., collective blade pitch) to main rotor blades 120. Collective configurations of main rotor blades 120 may change overall lift produced by main rotor blades 120. For increasing or decreasing overall lift in main rotor blades 120, the angle of attack for all main rotor blades 120 may be collectively altered by equal amounts and at a same time, resulting in ascent, descent, acceleration, or deceleration. Alteration of collective configuration of main rotor blades 120 may be accomplished by input from a collective control assembly (not illustrated).

Anti-torque pilot flight controls may allow a pilot to change the amount of anti-torque force applied to rotorcraft 100. Tail rotor blades 120B may operate to counter torque created by rotor system 110 and main rotor blades 120. Anti-torque pilot flight controls may change the amount of anti-torque force applied to change a heading (yaw) of rotorcraft 100. For example, providing anti-torque force greater than the torque effect created by rotor system 110 and main rotor blades 120 may cause rotorcraft 100 to rotate in a first direction, whereas providing anti-torque force less than the torque effect created by rotor system 110 and main rotor blades 120 may cause rotorcraft 100 to rotate in a second direction opposite the first direction. In some embodiments, anti-torque pilot flight controls may change the amount of anti-torque force applied by changing the pitch of tail rotor blades 120B, thereby increasing or reducing thrust produced by tail rotor blades 120B and causing the nose of rotorcraft 100 to yaw in a direction corresponding to application of input from a pedal assembly (not illustrated).

Rotorcraft 100 may include additional or different anti-torque devices, such as a rudder or a no-tail-rotor (NOTAR) anti-torque device. Conjunctive or alternative anti-torque embodiments may be operable to change an amount of anti-torque force provided by such additional or different anti-torque device or system.

Cyclic trim assemblies and a collective trim assembly are operable to receive and measure mechanical communications of cyclic and collective motions from a pilot. In a representative aspect, cyclic trim assemblies and the collective trim assembly may embody components of a fly-by-wire (FBW) flight control system, and measurements from cyclic trim assemblies and the collective trim assembly may be sent to a flight control computer (FCC) operable to instruct rotor system 110 to change a position or configuration of main rotor blades 120 based on received or otherwise determined measurements. For example, the FCC may be in communication with actuators or other devices operable to change the pitch or position of main rotor blades 120.

As representatively illustrated in FIGS. 2A and 2B, rotor blade 120 has a leading edge 201, a trailing edge 203, a root end 205, and a tip end 207. It should be appreciated that rotor blade 120 may be configured or otherwise suitably adapted to take on a variety of configurations. For example, rotor blade 120 can have a degree of built-in twist between root end 205 and tip end 207. In another embodiment, rotor blade 120 can have an anhedral tip, or any other desired aerodynamic profile. Rotor blade 120 includes mounting holes 209, 211, and 213, which provide corresponding apertures for bolts 329, 331, and 333, respectively (as shown in FIG. 2B). Thus, further disclosure herein regarding the location of bolts 329, 331, and 333, also applies to the location of holes 209, 211, and 213 on rotor blade 120. It should be appreciated that holes 209, 211, and 213 can include bushings, or the like, located therein as a bearing surface for shanks of bolts 329, 331, and 333, respectively. Rotor blade 120 can include a forward taper 215 and an aft taper 217 that each taper toward a centerline axis of rotor blade 120 until joining at a rounded portion 219. Rounded portion 219 can have a radius as a function of a desired edge distance from, e.g., hole 209.

FIGS. 3-6 representatively illustrate various features of rotor hub 110 assembly in accordance with an embodiment. Rotor hub 110 includes a yoke 315 coupled to a mast 317. Each rotor blade 120 is coupled to yoke 315 with a grip 319. An inboard portion of each grip 319 is secured within an opening of yoke 315 with centrifugal force (CF) bearing 335. Grip 319 is a single substantially continuous member having an upper extension 337 and a lower extension 339. Rotor blade 120 is attached to the outboard portion of grip 319 with first bolt 329, second bolt 331, and third bolt 333. Pitch horn 323 is interposed between rotor blade 120 and upper and lower extensions 337, 339 of grip 319. Damper 321 is attached between yoke 315 and a damper attachment portion 341 of pitch horn 323.

During operation, dynamic forces act on rotor blade 120 and associated components of rotor system 110. Primary dynamic forces include a combination of centrifugal force loading in a centrifugal force direction 445, a chord-wise bending in a bending direction 447 (see FIG. 4), and a beam-wise bending in a bending direction 649 (see FIG. 6). Such loading is addressed by the attachment mechanism used to attach rotor blade 120 to the grip 319. Additionally, torsional loading about pitch change axis 443 can be experienced from aerodynamic loading, as well as pitch change inputs from pitch horn 323.

Figure 3:
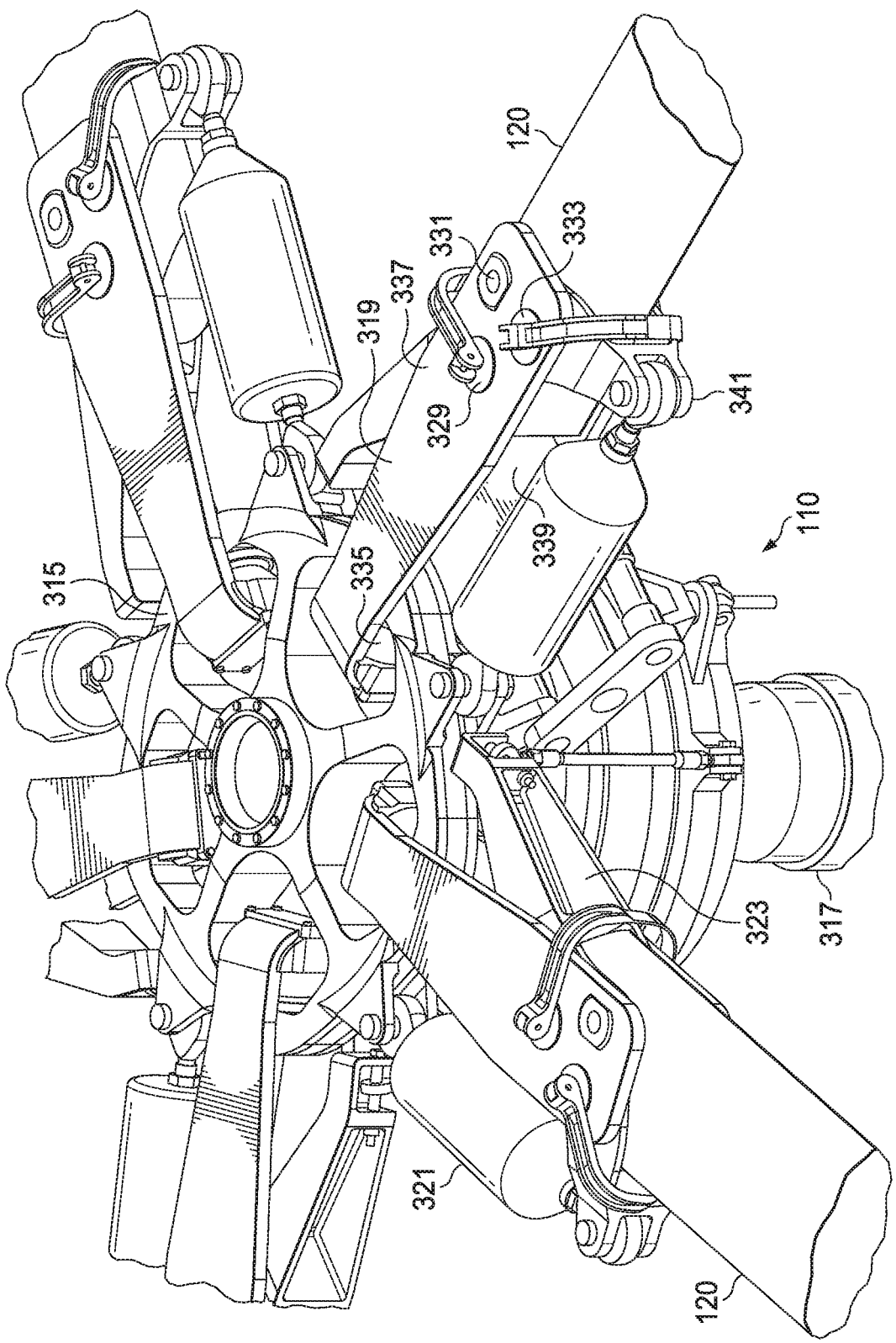
FIG. 3 representatively illustrates a perspective view of a main rotor assembly, in accordance with an embodiment.
Figure 4:
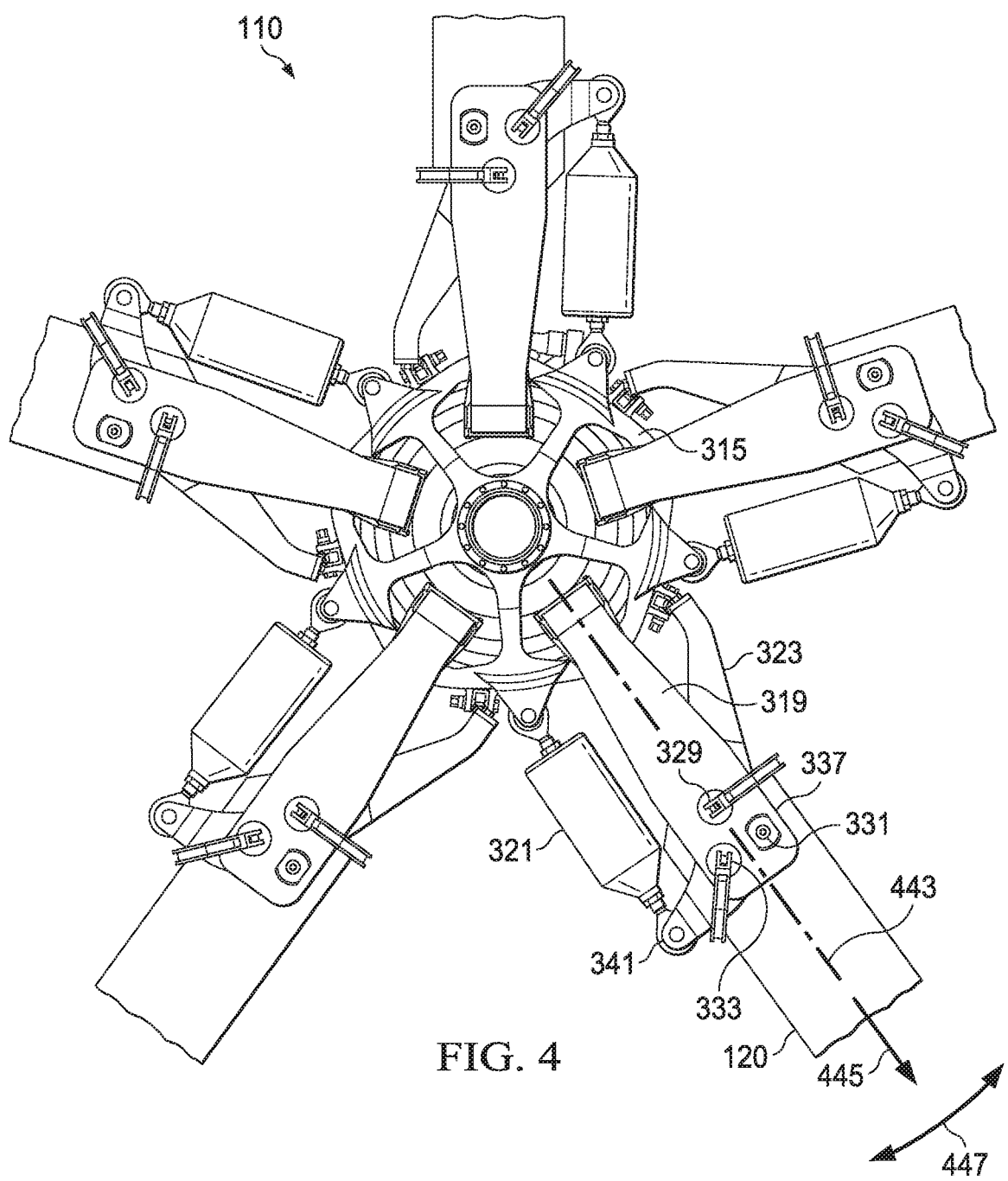
FIG. 4 representatively illustrates a top view of a main rotor assembly, in accordance with an embodiment.
Figure 5:
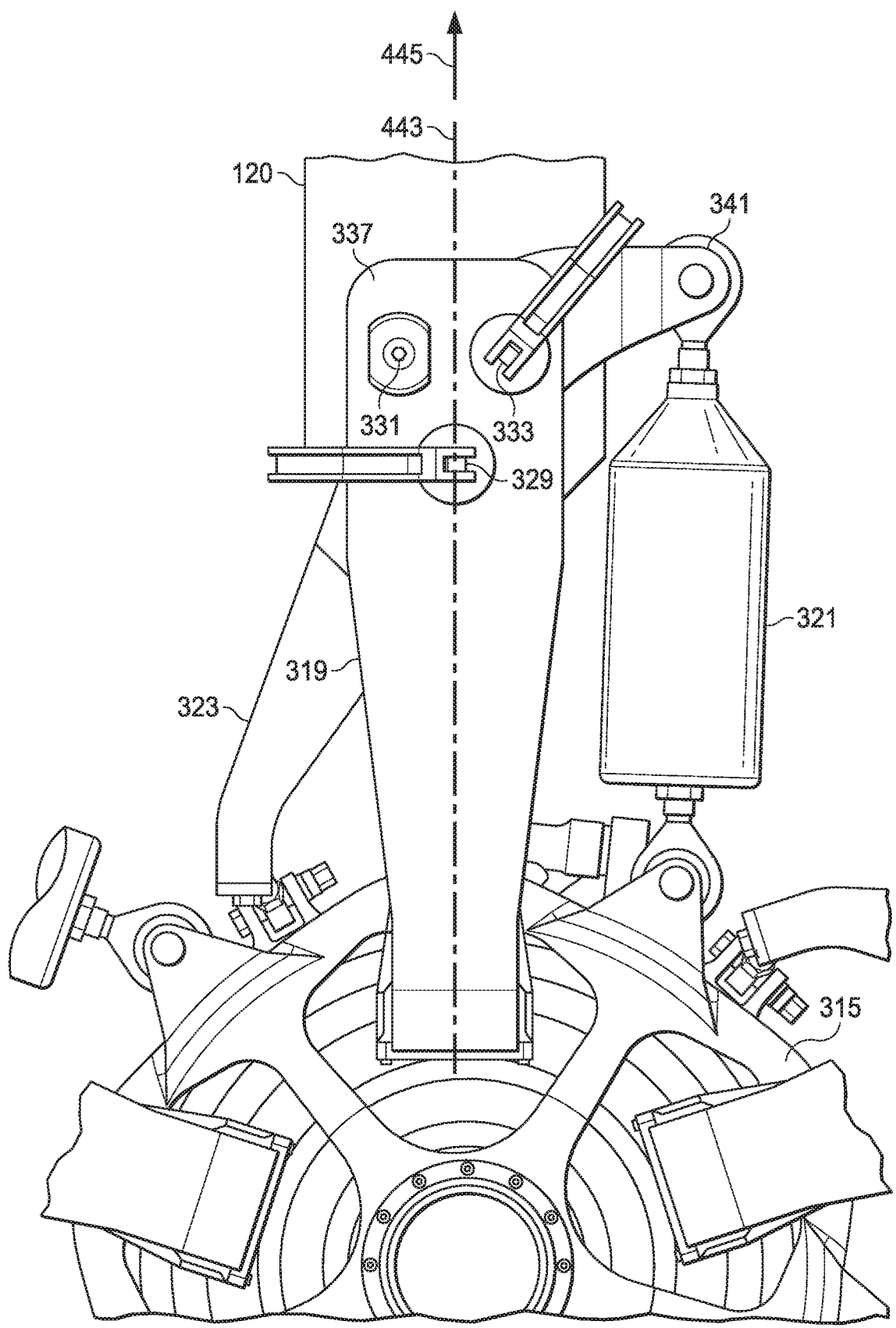
FIG. 5 representatively illustrates a top view of a portion of a main rotor assembly, in accordance with an embodiment.

In FIGS. 3-5, first bolt 329 and third bolt 333 are representatively illustrated as quick removable expandable bolts configured to be removed without the need for a tool. A pin can be removed from the lower portion, allowing a handle to be pivoted, which actuates a cam member allowing the bolt to be removed. Once first bolt 329 and third bolt 333 are removed, rotor blade 120 is free to rotate about second bolt 331. It should be appreciated that some rotorcraft operators do not have a requirement for folding rotor blades 120; as such, all first bolts 329, second bolts 133, and third bolts 333 may be conventional bolts.

Figure 6:
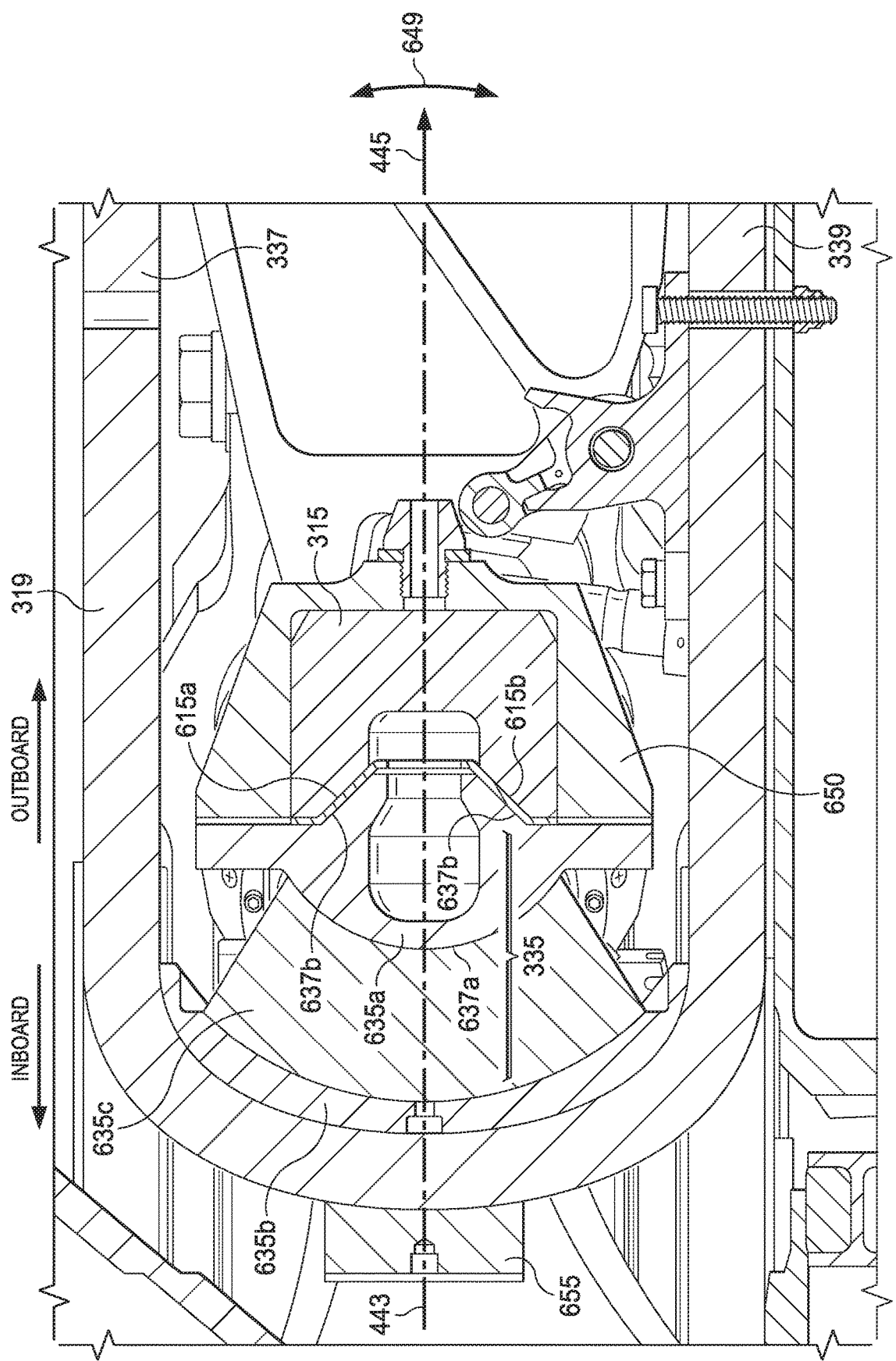
FIG. 6 representatively illustrates a cross-section of a conical shear boss of a centrifugal force (CF) bearing and a portion of a rotor attachment assembly, in accordance with an embodiment.

As representatively illustrated in FIG. 6, rotor grip 319 is configured for attachment to centrifugal force (CF) bearing 335 and rotor blade 120 (not illustrated in FIG. 6). Yoke 315 is configured with a tapered recess (e.g., taper portions 615a, 615b) for seating and engagement with CF bearing 335. CF bearing 335 includes an inner-member 635a, an outer-member 635b, and an elastic member 635c (e.g., formed from an elastomeric material) disposed between and interposing the inner-member 635a and the outer-member 635b. The outer-member 635b is attached to a portion of rotor grip 319. The inner-member 635a includes a first surface 637a and a second surface 637b, where the second surface 637b opposes the first surface 637a. First surface 637a has a protrusion that extends in a direction toward the outer-member 635b. In an embodiment, the protrusion of first surface 637a may have, e.g., a hemispherical shape, although other protruded shapes are possible. Second surface 637b has a boss that protrudes in a direction away from the elastic member 635c. The boss has a substantially continuously tapered (e.g., conic) profile. In an assembled configuration, the boss of second surface 637b is disposed in and on a tapered recess (e.g., taper portions 615a, 615b) of yoke 315.

Figure 7:
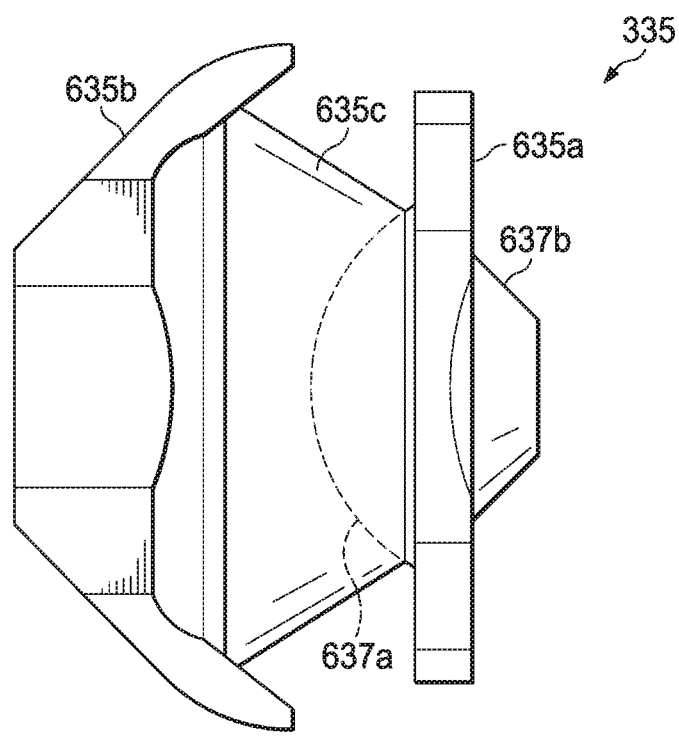
FIG. 7 representatively illustrates a side view of a conical shear boss of a CF bearing, in accordance with an embodiment.
Figure 8:
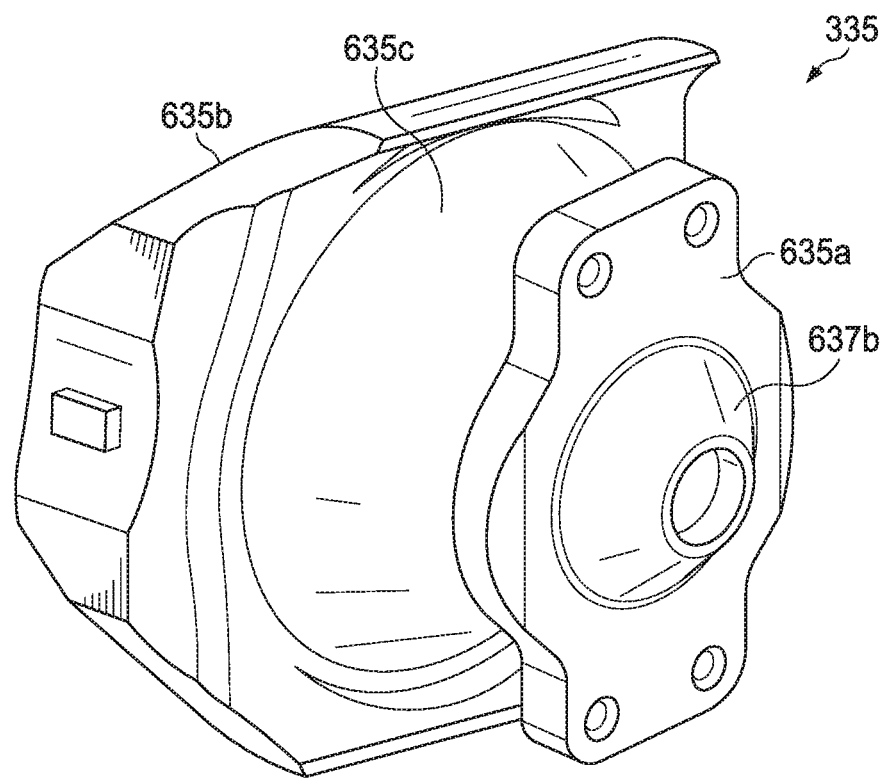
FIG. 8 representatively illustrates a perspective view of a conical shear boss of a CF bearing, in accordance with an embodiment.

FIG. 7 representatively illustrates a side view of a conical shear boss feature of inner member 635a of CF bearing 335, in accordance with an embodiment. FIG. 8 representatively illustrates a perspective view of the conical shear boss feature of inner member 635a of CF bearing 335, in accordance with an embodiment. The tapered profile of second surface 637b of the conical shear boss feature of inner member 635a is substantially matched to the tapered profile of the taper recess 615a, 615b of yoke 315. Accordingly, and in representative implementation, CF bearing 335 is configured to transmit at least one of centrifugal force, lateral shear, or vertical shear mechanical loads into yoke 315, whereby stress in CF bearing 335 and yoke 315 (or other associated parts) is reduced.

In a representative aspect, an inboard surface profile of outer member 635b may be configured for seating to and engagement with grip 319. In another representative aspect, an inboard surface profile of elastic member 635c may be configured for seating to and engagement with an outboard surface of outer member 635b (e.g., the inboard surface profile of elastic member 635c including a substantially hemispherical protrusion extending toward outer member 635b, although other shapes are possible). In another representative aspect, an outboard surface profile of elastic member 635c may be configured for seating to and engagement with first surface 637a of inner member 635a (e.g., the outboard surface of elastic member 635c including a substantially hemispherical cavity, although other intruded shapes are possible).

Figure 9:
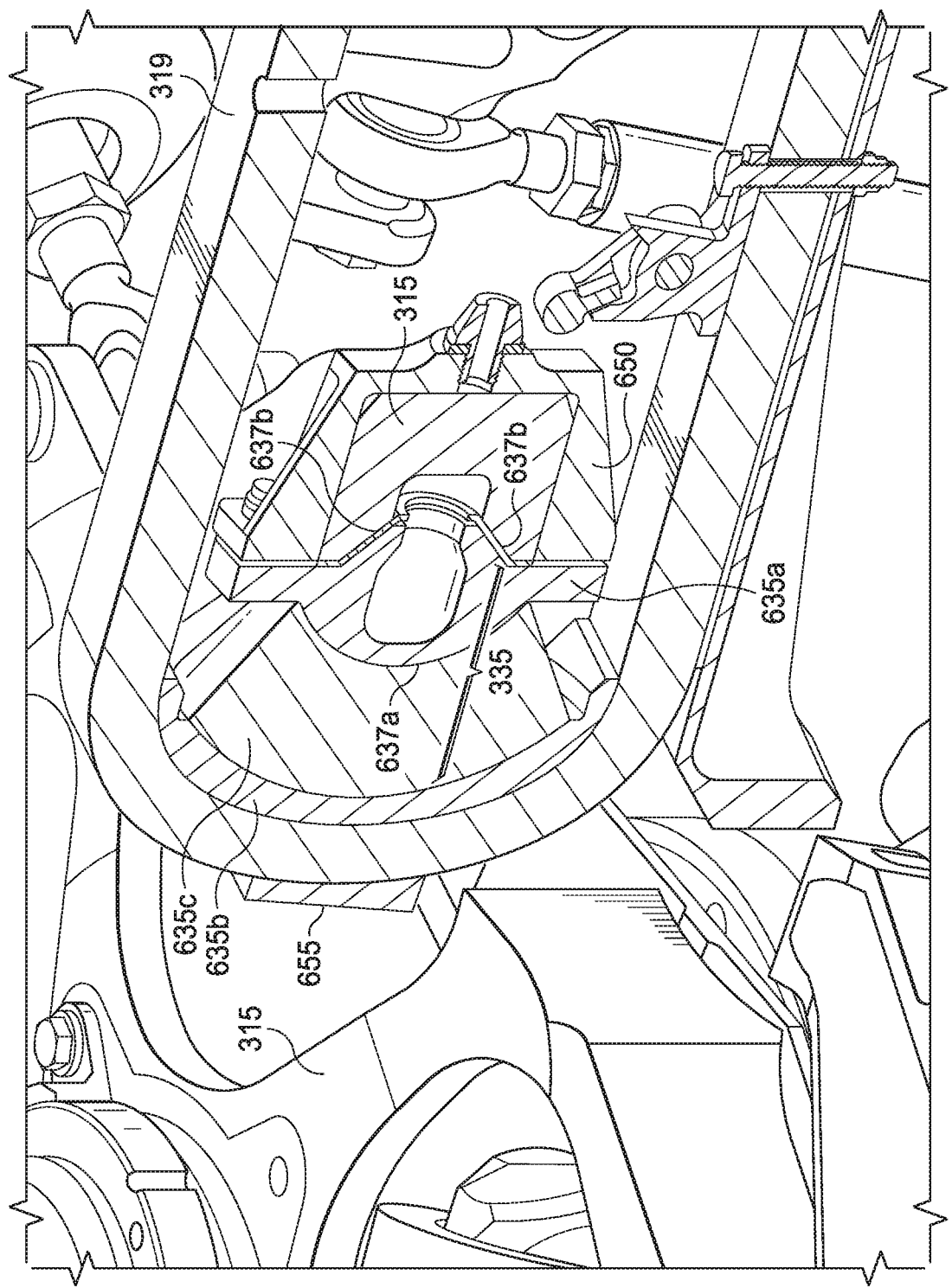
FIG. 9 representatively illustrates a perspective cut-away view of a conical shear boss of a CF bearing in a cut-away portion of a rotor assembly, in accordance with an embodiment.
Figure 10:
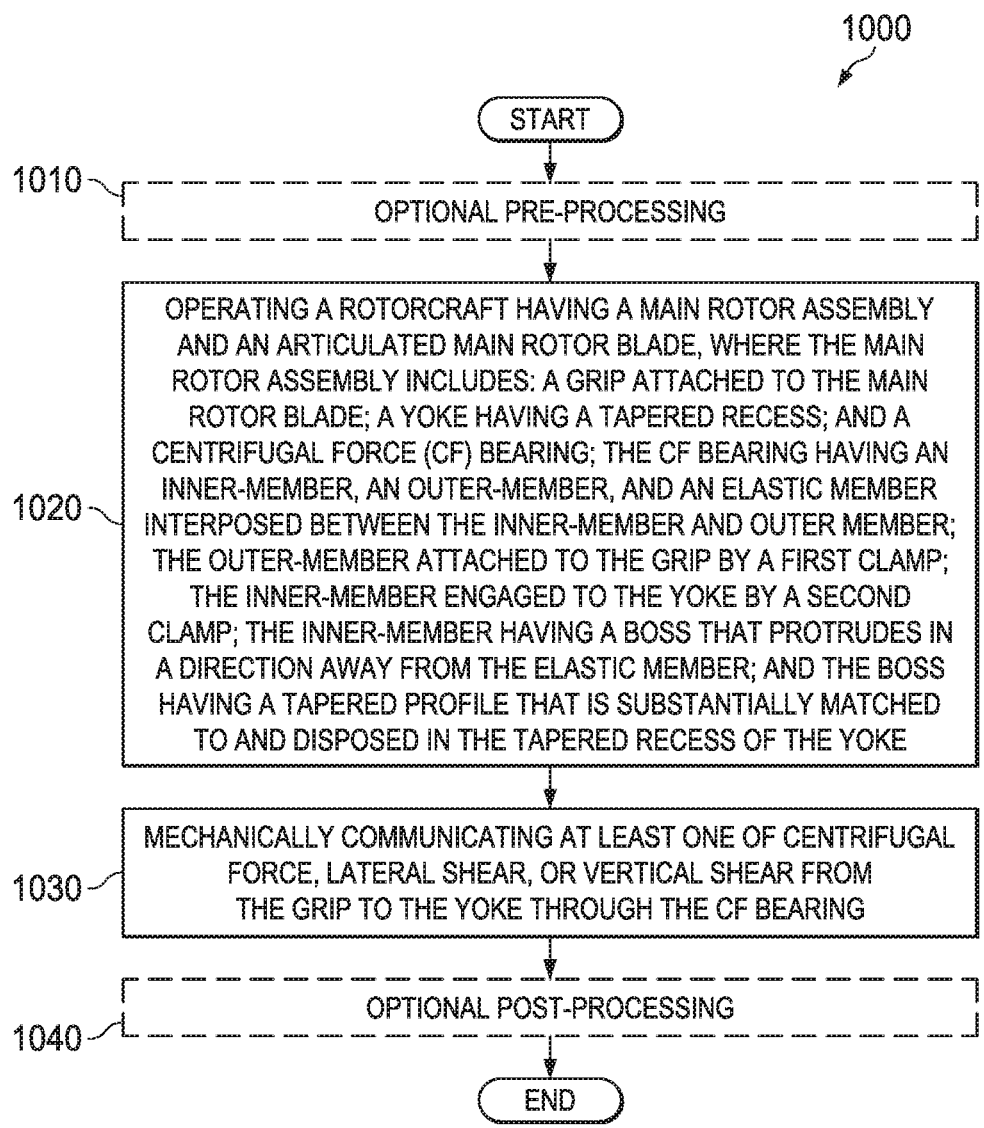
FIG. 10 representatively illustrates a method in accordance with an embodiment.

FIG. 9 representatively illustrates a perspective view of a cut-away portion of CF bearing 635 in a portion of rotor hub system 110, in accordance with an embodiment. An outboard portion of CF bearing 635 (e.g., inner member 635a) may be attached to yoke 315 by inner clamp 650 (although other mechanisms of attachment are possible). An inboard portion of CF bearing 635 (e.g., outer member 635b) may be attached to grip 319 by outer clamp 655 (although other mechanisms of attachment are possible). Elastic member 635c may be registered to interposition between inner member 635a and outer member 635b by inner clamp 650 and outer claim 655 (although other mechanisms of registration or attachment are possible).

In a representative embodiment, a centrifugal force (CF) bearing for a rotorcraft includes a first member, a second member, and a third member. The third member is interposed between the first member and the second member. The second member has a first side with a first surface, and a second side with a second surface. The second side opposes the first side. The first surface includes a first protruding feature that extends in a direction toward the first member. The second surface includes a second protruding feature that extends in a direction away from the third member. The second protruding feature has a tapered profile. The tapered profile may be continuously tapered. The second protruding feature may include a conical boss. The first protruding feature may include a substantially hemispherical or substantially ovoid shape. The first member may be configured for attachment to a rotor grip. The second member may be configured for engagement with a rotor yoke. The third member may include an elastic material. The CF bearing may be configured to communicate a mechanical load from the rotor grip through the conical boss to the rotor yoke. The tapered profile may be substantially matched for positive engagement of the conical boss in a tapered recess of the rotor yoke. The mechanical load may be at least one of centrifugal force, lateral shear, or vertical shear. The rotor grip may be one of a main rotor grip, a tail rotor grip, a prop-rotor grip, a tandem rotor grip, or a coaxial rotor grip. The rotor yoke may be a corresponding one of a main rotor yoke, a tail rotor yoke, a prop-rotor yoke, a tandem rotor yoke, or a coaxial rotor yoke. The conical boss may be configured for location to and engagement in a receiving portion of the main rotor yoke. The first member may include at least one of steel or titanium, or the like. The second member may include 6Al-4V titanium, or the like. The third member may include an elastomeric material.

In another representative embodiment, a rotor assembly includes a grip configured for attachment to a rotor blade, a yoke having a tapered recess, and a centrifugal force (CF) bearing. The CF bearing includes an inner-member, an outer-member, and an elastic member interposed between the inner-member and the outer-member. The outer-member is attached to a portion of the grip. The inner-member includes a first surface and a second surface, where the second surface opposes the first surface. The first surface includes a protrusion that extends in a direction toward the outer-member. The second surface includes a boss that protrudes in a direction away from the elastic member. The boss has a continuously tapered profile and is disposed in the tapered recess of the yoke. The outer-member may be attached to the grip with an outer-clamp. The boss may be located to the yoke by attachment of the inner-member to an inner-clamp. The continuously tapered profile may be tapered in a direction away from the elastic member. The protrusion may include a substantially hemispherical or substantially ovoid shape. The continuously tapered profile may be substantially matched to a tapered profile of the tapered recess of the yoke. The CF bearing may be configured to communicate a mechanical load from the grip through the boss to the yoke. The elastic member may be configured to communicate the mechanical load between the outer-member and the inner-member. The mechanical load may be at least one of centrifugal force, lateral shear, or vertical shear. The rotor assembly may be a main rotor assembly. The outer-member may include a first metal. The elastic member may include an elastomeric material. The inner-member may include a second metal. The first metal may include steel or titanium, or the like. The elastomeric material may include vulcanized rubber, high-density polyurethane, or the like. The second metal may include 6Al-4V titanium, or the like.

In yet another representative embodiment, a method 100 may include steps of: optional pre-processing 1010 (e.g., preparing rotorcraft 100 for operation, installing a CF bearing 335 in accordance with representative embodiments, inspecting a CF bearing 335 in accordance with representative embodiments, removing a CF bearing 335 in accordance with representative embodiments, replacing a CF bearing 335 in accordance with representative embodiments, combinations thereof, or the like); and operating 1020 a rotorcraft with an articulated main rotor blade, where a main rotor assembly of the rotorcraft includes a grip attached to the articulated main rotor blade, a yoke having a tapered recess, and a centrifugal force (CF) bearing interposed between the grip and the yoke. The CF bearing has an inner-member, an outer-member, and an elastic (e.g., elastomeric) member interposed between the inner-member and the outer-member. The outer-member is attached to the grip by a first clamp. The inner-member is engaged or located to the yoke by a second clamp. The inner-member has a boss that protrudes in a direction away from the elastic member. The boss has a tapered profile that is substantially matched to and disposed in the tapered recess of the yoke. Method 1000 may further include a step of mechanically communicating 1030 at least one of centrifugal force, lateral shear, or vertical shear from the grip through the CF bearing to the yoke. Method 1000 may further include one or more steps of optional post-processing 1040 (e.g., preparing rotorcraft 100 for concluding operation, concluding operation of rotorcraft 100, removing a CF bearing 335 in accordance with representative embodiments, inspecting a CF bearing 335 in accordance with representative embodiments, replacing a CF bearing 335 in accordance with representative embodiments, or the like).

As used herein, the terms "comprises," "comprising," "includes," "including," "has," "having," or any contextual variant thereof, are intended to reference a non-exclusive inclusion. For example, a process, product, article, or apparatus that comprises a list of elements is not necessarily limited to only those elements, but may include other elements not expressly listed or inherent to such process, product, article, or apparatus. Furthermore, unless expressly stated to the contrary, "or" refers to an inclusive or and not an exclusive or. That is, the term "or" as used herein is generally intended to mean "and/or" unless otherwise indicated. For example, a condition "A or B" is satisfied by any one of the following: A is true (or present) and B is false (or not present), A is false (or not present) and B is true (or present), and both A and B are true (or present). As used herein, a term preceded by "a" or "an" (and "the" when antecedent basis is "a" or "an") includes both singular and plural connotations for such term, unless the context clearly indicates otherwise.

Although steps or operations may be presented in a specific order, this order may be changed in different embodiments. In some embodiments, to the extent multiple steps are shown as sequential in the preceding description, some combination of such steps in alternative embodiments may be performed at a same time. The sequence of operations described herein may be interrupted, suspended, or otherwise controlled by another process.

It will also be appreciated that one or more elements illustrated in the Figures may also be implemented in a more-separated or more-integrated manner, or even removed or rendered inoperable in certain cases, as may be useful in accordance with particular applications and embodiments. Additionally, any lines or arrows in the Figures should be considered only as representative, and therefore not limiting, unless otherwise specifically noted.

Examples or illustrations provided herein are not to be regarded in any way as restrictions on, limits to, or express definitions of any term or terms with which they are associated. Instead, these examples or illustrations are to be regarded as being described with respect to a particular embodiment and as merely illustrative. Those skilled in the art will appreciate that any term or terms with which these examples or illustrations are associated will encompass other embodiments that may or may not be given therewith or elsewhere in the specification, and all such embodiments are intended to be included within the scope of that term or set of terms. Language designating such non-limiting examples and illustrations includes, but is not limited to: "for example," "for instance," "e.g.," "etc., "or the like," "in a representative embodiment," "in one embodiment," "in another embodiment," "in some embodiments," or the like. Reference throughout this specification to "one embodiment," "an embodiment," "a representative embodiment," "a particular embodiment," or "a specific embodiment," or contextually similar terminology, means that a particular feature, structure, property, or characteristic described in connection with the described embodiment is included in at least one embodiment, but may not necessarily be present in all embodiments. Thus, respective appearances of the phrases "in one embodiment," "in an embodiment," or "in a specific embodiment," or similar terminology in various places throughout the description are not necessarily referring to the same embodiment. Furthermore, particular features, structures, properties, or characteristics of any specific embodiment may be combined in any suitable manner with one or more other embodiments.

The scope of the present disclosure is not intended to be limited to the particular embodiments of any process, product, machine, article of manufacture, assembly, apparatus, means, methods, or steps herein described. As one skilled in the art will appreciate, various processes, products, machines, articles of manufacture, assemblies, apparatuses, means, methods, or steps, whether presently existing or later developed, that perform substantially the same function or achieve substantially similar results in correspondence to embodiments described herein, may be utilized according to their description herein. The appended claims are intended to include within their scope such processes, products, machines, articles of manufacture, assemblies, apparatuses, means, methods, or steps.

Benefits, other advantages, and solutions to problems have been described herein with regard to representative embodiments. However, any benefits, advantages, solutions to problems, or any component thereof that may cause any benefit, advantage, or solution to occur or to become more pronounced are not to be construed as critical, required, or essential features or components.

What is claimed is:

1. A device, comprising:
   a centrifugal force (CF) bearing for a rotorcraft, the CF bearing comprising:
      a first member configured for contacting engagement with an inner surface of a rotor grip;
      a second member configured for engagement with a rotor yoke, and a third member, the third member interposed between the first member and the second member, wherein:
      the second member comprises:
         a rigid plate;
         a first protruding feature that extends outward from a first surface of the rigid plate and in a direction toward the first member, the first protruding feature fitting within a recess in the third member and in contacting engagement with a surface of the third member that defines the recess;
         a second protruding feature that extends outward from a second surface of the rigid plate and in a direction away from the third member;
         the second protruding feature comprises a tapered profile with straight sidewalls, the taper extending linearly and continuously from the second surface of the rigid plate to the outermost end of the second protruding feature; and
         wherein the rigid plate includes a first rigid extension at one end of the rigid plate and a second rigid extension at an opposite end of the rigid plate.

2. The device of claim 1, wherein the second protruding feature comprises a conical boss.

3. The device of claim 2, wherein:
   the third member comprises an elastic material; and
   the CF bearing is configured to communicate a mechanical load from the rotor grip through the conical boss to the rotor yoke.

4. The device of claim 3, wherein the tapered profile is matched for positive engagement of the conical boss in a tapered recess of the rotor yoke.

5. The device of claim 3, wherein:
   the rotor grip is one of a main rotor grip, a tail rotor grip, a prop-rotor grip, a tandem rotor grip, or a coaxial rotor grip; and
   the rotor yoke is a corresponding one of a main rotor yoke, a tail rotor yoke, a prop-rotor yoke, a tandem rotor yoke, or a coaxial rotor yoke.

6. The device of claim 1, wherein:
   the first member comprises at least one of steel or titanium;
   the second member comprises 6Al-4V titanium; and
   the third member comprises an elastomeric material.

7. The device of claim 1, wherein the first rigid extension has a uniform thickness extending from the outermost periphery of the second member to an interface between the first rigid extension and the first protruding feature, the interface being offset from the outermost periphery of the second member, wherein the uniform thickness is measured between the first surface of the rigid plate and the second surface of the rigid plate.

8. The device of claim 1, wherein the rigid plate has a first diameter at a widest point of the rigid plate and the second protruding feature has a second diameter at a widest point of the second protruding feature, the first diameter being greater than the second diameter.

9. A system, comprising:
   a rotor assembly comprising:
      a yoke coupled to a rotating mast and having a tapered recess;
      a grip configured for attachment to a rotor blade, the grip extending through an opening in the yoke; and
      a centrifugal force (CF) bearing, wherein:
         the CF bearing comprises an inner-member, an outer-member, and an elastic member interposed between the inner-member and the outer-member;
         the outer-member is attached to a portion of the grip;
         the inner-member comprises a first surface and a second surface, the second surface opposing the first surface;
         the first surface comprises a protrusion that extends in a direction toward the outer-member, the protrusion having a profile that is curvilinear;
         the second surface comprises a planar external surface and a boss that protrudes from the planar external surface in a direction away from the elastic member; and
         the boss has a profile that is continuously and linearly tapered from the planar external surface to an outermost end of the boss and further wherein the outermost periphery of the boss is radially displaced inward of the outermost periphery of the planar external surface, wherein the boss is disposed in and matches a profile of the tapered recess of the yoke.

10. The system of claim 9, wherein the outer-member is attached to the grip with an outer-clamp.

11. The system of claim 10, wherein the boss is located to the yoke by attachment of the inner-member to an inner-clamp, the inner clamp engaging with an outer surface of the yoke.

12. The system of claim 9, wherein the continuously and linearly tapered profile is tapered in a direction away from the elastic member.

13. The system of claim 12, wherein the continuously and linearly tapered profile is matched to a tapered profile of the tapered recess of the yoke.

14. The system of claim 9, wherein:
   the CF bearing is configured to communicate a mechanical load from the grip through the boss to the yoke; and
   the elastic member is configured to communicate the mechanical load between the outer-member and the inner-member.

15. The system of claim 14, wherein the mechanical load comprises at least one of centrifugal force, lateral shear, or vertical shear.

16. The system of claim 9, wherein the rotor assembly is a main rotor assembly.

17. The system of claim 9, wherein:
the outer-member comprises a first metal;
the elastic member comprises an elastomeric material; and
the inner-member comprises a second metal.

18. The system of claim 17, wherein:
the first metal comprises steel or titanium;
the elastomeric material comprises vulcanized rubber; and
the second metal comprises 6Al-4V titanium.

19. A method, comprising:
operating a rotorcraft having a main rotor assembly and an articulated main rotor blade, by
receiving a pilot control input; and
in response to the pilot control input, changing a configuration of a main rotor assembly of the rotorcraft;
wherein the main rotor assembly of the rotorcraft comprises:
 a grip that is attached to an articulated main rotor blade; and
 a yoke that has a tapered recess, the tapered recess having a first diameter at the mouth of the tapered recess and a second diameter less than the first diameter at the bottom of the tapered recess, and an intermediate diameter along sidewalls of the tapered recess, the sidewalls being straight from the mouth of the tapered recess to the bottom of the tapered recess; and
mechanically communicating a mechanical load from the grip to the yoke through a centrifugal force (CF) bearing that is interposed between the grip and the yoke, wherein:
 the CF bearing has an inner-member, an outer-member, and an elastic member interposed between the inner-member and the outer-member;
 the outer-member is attached to the grip by a first clamp;
 the inner-member is engaged to the yoke by a second clamp, and wherein the inner-member includes
  a rigid plate having a first rigid extension at one end of the rigid plate and a second rigid extension at an opposite end of the rigid plate,
  a protruding feature that extends outward from a first surface of the rigid plate, and
  a boss that extends away from the elastic member and outward from a second surface of the rigid plate, the boss having a tapered profile that is matched to and disposed in the tapered recess of the yoke, the taper extending continuously and with a fixed slope from the second surface of the rigid plate to the outermost end of the boss.

20. The method of claim 19, wherein the main rotor assembly further comprises
a plurality of grips attached to respective ones of a plurality of main rotor blades; and
the yoke being coupled to the plurality of main rotor blades by way of the plurality of grips.

21. The method of claim 19, wherein the first rigid extension includes a first external surface of the inner-member and a second external surface of the inner-member opposite the first external surface, the first external surface and the second external surface being spaced apart from one another by an external side surface that runs orthogonally to the first external surface and the second external surface, the first rigid extension having a uniform thickness between the first external surface and the second external surface, the uniform thickness extending from the outermost periphery of the inner-member to an interface between the first rigid extension and the protruding feature, the interface being disposed radially inward from the outermost periphery of the inner-member.

* * * * *